US 12,540,956 B2

(12) United States Patent
Suomi et al.

(10) Patent No.: US 12,540,956 B2
(45) Date of Patent: Feb. 3, 2026

(54) MERGING UNIT WITH A SETTABLE TIME CONSTANT

(71) Applicant: ABB Schweiz AG, Baden (CH)

(72) Inventors: Frej Suomi, Vaasa (FI); Heikki Björkman, Vaasa (FI)

(73) Assignee: ABB Schweiz AG, Baden (CH)

( * ) Notice: Subject to any disclaimer, the term of this patent is extended or adjusted under 35 U.S.C. 154(b) by 485 days.

(21) Appl. No.: 18/147,886

(22) Filed: Dec. 29, 2022

(65) Prior Publication Data

US 2023/0228797 A1 Jul. 20, 2023

(30) Foreign Application Priority Data

Jan. 3, 2022 (EP) .................................... 22150040

(51) Int. Cl.
*G01R 19/25* (2006.01)
*H03M 1/12* (2006.01)

(52) U.S. Cl.
CPC .............. *G01R 19/25* (2013.01); *H03M 1/12* (2013.01)

(58) Field of Classification Search
None
See application file for complete search history.

(56) References Cited

U.S. PATENT DOCUMENTS

| 5,579,247 A | 11/1996 | Kerth et al. | |
| 8,793,298 B2* | 7/2014 | Mathai | H03H 17/0294 708/316 |
| 2006/0028197 A1* | 2/2006 | Quiquempoix | G01R 21/133 324/142 |
| 2014/0253109 A1* | 9/2014 | Singh | G01R 15/20 324/227 |
| 2018/0176249 A1* | 6/2018 | Hong | G06F 21/55 |

OTHER PUBLICATIONS

European Search Report; Application No. EP 22 15 0040; Issued: Jun. 13, 2022; 2 Pages.

* cited by examiner

*Primary Examiner* — Matthew G Marini
(74) *Attorney, Agent, or Firm* — Whitmyer IP Group LLC (57) ABSTRACT

A merging unit including one or more input interfaces for receiving a plurality of input signals wherein one or more voltages and/or one or more currents measured by a plurality of measurement devices, digital processing means and one or more output interfaces for outputting an output signal. The digital processing means are configured to high-pass filter, using one or more digital filters, at least one of the plurality of input signals for lowering a time constant associated with the at least one of the one or more input signals to match a target time constant or for raising a high-pass cut-off frequency associated with the at least one of the one or more input signals to match a target high-pass cut-off frequency and to merge, following the high-pass filtering, the plurality of input signals into the output signal having a pre-defined output format.

13 Claims, 3 Drawing Sheets

MERGING UNIT WITH A SETTABLE TIME CONSTANT

TECHNICAL FIELD

Various example embodiments relate to electrical substation protection and metering systems.

BACKGROUND

Merging units are commonly used in electrical substation protection and metering systems for measuring current and voltage signals from sensors and instrument transformers and merging the measured data into a standard digital output format for use by other devices, e.g., for various power system protection application purposes. Said current signals may be associated with a plurality of different time constants (or equally a plurality of different high-pass cut-off frequencies). This becomes a problem when sharing measurements between devices which are of different types. Namely, when input time constants (or equally highpass cut-off frequencies) differ, any current differential protection algorithm may not necessarily see exactly the same current measurements even if they should be equal. Problems may occur especially at transients or when the frequency response does not consist solely of the nominal frequency or does not comprise the nominal frequency at all.

SUMMARY

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

Some embodiments provide an apparatus, a method, and computer program for enabling a settable time constant or high-pass cut-off frequency.

BRIEF DESCRIPTION OF DRAWINGS

In the following, example embodiments will be described in greater detail with reference to the attached drawings, in which.

DETAILED DESCRIPTION

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

The term "high-pass cut-off frequency" as used in the following may be defined as a −3 dB point of a high-pass frequency response (i.e., as the frequency at which the value of high-pass frequency response has lowered from its maximum value by 3 dB). The high-pass cutt-off frequency is connected to the time constant via the well-known equation $$f_c = \frac{1}{2\pi\tau},$$

where $f_c$ is the high-pass cut-off frequency and $\tau$ is the time constant.

As described above, merging units are commonly used in electrical substation automation systems for measuring current and voltage signals from sensors and instrument transformers and merging the measured data into a standard digital output format for use by other devices, e.g., for various power system protection application purposes. Typically, it is advantageous if the current inputs of the merging unit possess a high time constant (i.e., possess high-pass characteristics with a low cut-off frequency) as this enables the merging unit to better represent decaying direct current (DC) offset in power network fault situations. Combining different current input technologies or even same technology but different components often leads, however, to having to deal with different input time constants. This becomes a problem especially when sharing measurements between devices which are not of the same type. When input time constants differ between different input signals (i.e., between different measurements), a current differential protection algorithm may effectively see the two current measurements as having different values. IEC61869-6 standard gives the limit of maximum 1 Hz highpass cutoff frequency, but below 1 Hz it can be any value depending on the implementation. Usually, different types of devices or even different manufacturers devices are not combined, but the IEC 61850 standard aims to enable this. The input time constant is typically a result of the hardware design and thus it is not a parameter which can be changed dynamically by the user.

The embodiments discussed below in detail seek to overcome at least some of the aforementioned problems by implementing a settable time constant (or a settable high-pass cut-off frequency) in the merging unit. This settable time constant or high-pass cut-off frequency would enable the user to match the time constants between used input hardware (if they are of different types) so as to, e.g., improve differential protection accuracy.

Figure 1:
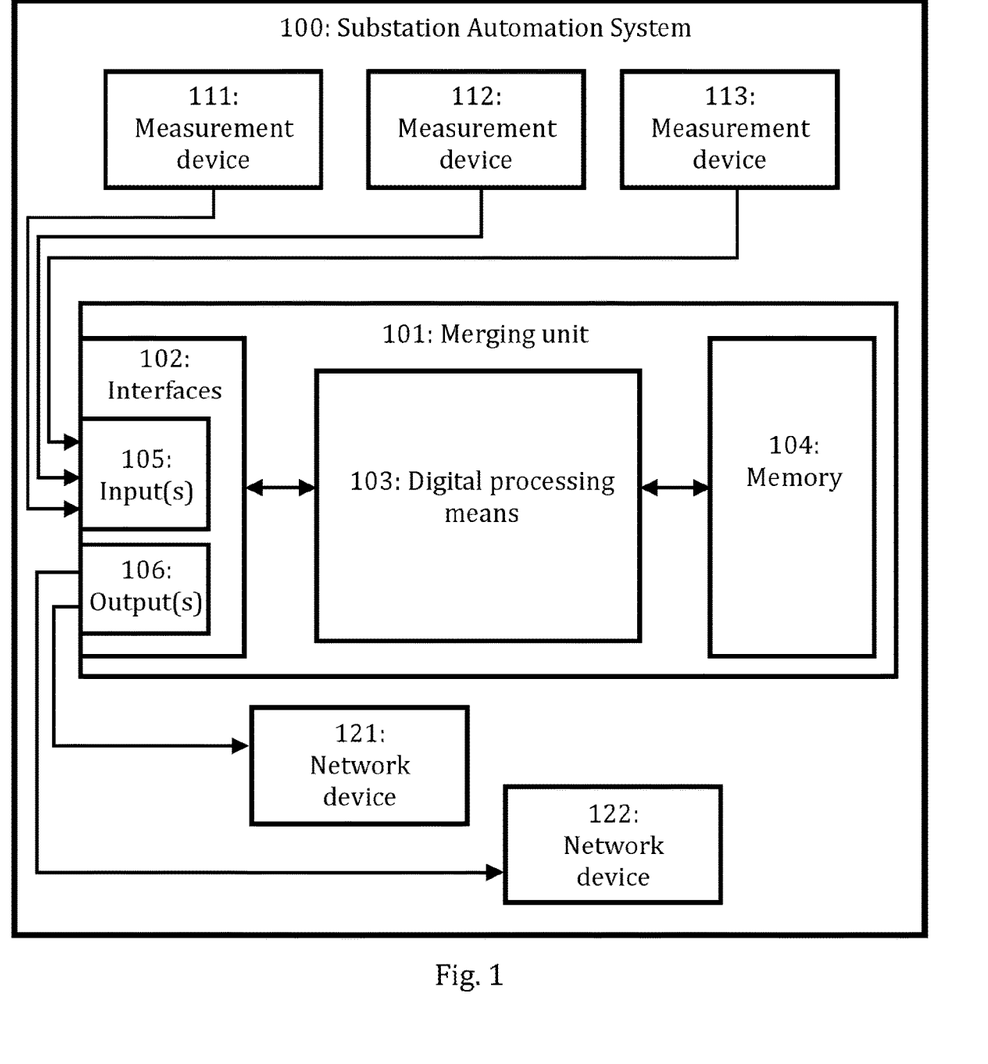
FIG. 1 illustrates an exemplary system according to an embodiment.

FIG. 1 illustrates an exemplary system 100 according to an embodiment. The system 100 may be called a substation automation system (SAS), a power system or a substation protection and metering system. The system 100 comprises a plurality of measurement devices 111, 112, 113, a merging unit 101 and one or more network devices 121, 122. Any of the illustrated elements may be logical elements implemented as hardware or software or a combination thereof.

Said plurality of measurements devices 111, 112, 113 are devices configured to produce measurement data. Said measurement data may comprise analog and/or digital voltage measurements and/or analog and/or digital current measurements. The digital voltage and/or current measurement data may be outputted by the plurality of measurement devices 111, 112, 113 in various different formats. At least some of said different formats may be associated with different time constants (or equally with different high-pass cut-off frequencies).

Said plurality of measurement devices 111, 112, 113 may comprise one or more devices of any of the following types: an instrument transformer (IT), an electronic instrument transformer (EIT) and a low power instrument transformer (LPIT) (or other sensing device). A LPIT (or said other sending device) may comprise a sensor (e.g., a voltage sensor or a current sensor). Said plurality of measurement devices 111, 112, 113 may correspond to primary equipment in a switchgear of the system 100.

Said plurality of measurements devices 111, 112, 113 (or at least some of them) may provide analog output signals to the merging unit 101.

Optionally, at least some of said plurality of measurements devices 111, 112, 113 may comprise built-in analog-to-digital converters and data formatting means for generating sampled measured value (SMV) signals. SMV signals (or SMV messages) are digital signals comprising measurement data and having a pre-defined SV message format as defined in IEC 61850-9-2.

According to basic functionality of merging units, the merging unit 101 is configured to receive current and/or voltage signals from said plurality of measurements devices 111, 112, 113, merge the measured data into a standard digital output format and output at least one output signal having said standard digital output format to other devices (namely, here to the network devices 121, 122). For enabling said basic functionality as well as filtering functionality according to embodiments, the merging unit 101 comprises a plurality of interfaces 102, digital processing means 103 and at least one memory 104.

The plurality of interfaces 102 comprise at least a plurality of input interfaces 105 and one or more output interfaces 106. The plurality of input interfaces 105 comprise a plurality of input interfaces for reception of input signals (e.g., analog input signals) from the plurality of measurement devices 111, 112, 113. The merging unit 101 and the plurality of measurement devices 111, 112, 113 may be connected specifically via one or more wired connections (e.g., one or more cables). The plurality of input interfaces 105 for reception of input signals from the plurality of measurement devices 111, 112, 113 may use the IEC 61850-8-1 GOOSE (Generic Object Oriented Substation Event) profile.

In some embodiments, the one or more input interfaces 105 may also comprise at least one user interface for reception of user inputs provided by a user via at least one user input device of the merging unit 101 (e.g., a keyboard, a mouse, a trackball, a set of dedicated buttons and/or control dials, a touch pad and/or a touchscreen).

In some embodiments, at least one of the one or more input interfaces for reception of input signals from the plurality of measurement devices 111, 112, 113 corresponds to an analog-to-digital input interfaces configured to convert a received analog input signal to a digital input signal. In other words, the merging unit 101 may comprise analog-to-digital conversion means for converting one or more analog input signals of the merging unit 101 to one or more (corresponding) digital input signals which may be processed (e.g., filtered and merged) by the digital processing means 103.

The one or more output interfaces 105 comprise at least one or more output interfaces for outputting one or more merged (digital) output signals (i.e., a homogeneously defined digital data stream created from measured data and having a standardized format) produced by the merging unit based on the input signal(s) received via the plurality of input interfaces 105 to one or more network devices 121, 122. The output signals outputted via the one or more output interfaces 105 may have a pre-defined format. Said pre-defined format may specifically a format defined in a standard such as IEC 61850-9-2. The merging unit 101 and the one or more network devices 121, 122 may be connected specifically via one or more wired connections (e.g., one or more fiber optic connections and/or one or more electrical cables).

In some embodiments, the one or more interfaces 102 may further comprise one or more communication interfaces (being input/output interfaces) for realizing communication connectivity according to one or more communication protocols via one or more (wired and/or wireless) communication links and/or via one or more (wired and/or wireless) communication networks. Specifically, the one or more communication interfaces 910 may comprise, for example, interfaces providing a connection to the Internet and/or a core network of a wireless communications network. The one or more communication interface 910 may provide the apparatus with communication capabilities to communicate in a cellular communication system and enable communication between user devices (terminal devices) and different network nodes or elements and/or a communication interface to enable communication between different network nodes or elements, for example. The one or more communication interfaces may comprise standard well-known components such as an amplifier, filter, frequency-converter, (de)modulator, and encoder/decoder circuitries, controlled by the corresponding controlling units, and one or more antennas.

In some embodiments, the one or more communication interfaces may comprise one or more (optical or galvanic) Ethernet network interfaces.

The digital processing means 103 may be configured to implementing the functionalities of the merging unit 101 according to embodiments to be discussed below in detail. In summary, the digital processing means may be configured at least to high-pass filter, using one or more digital filters, at least one of the plurality of input signals received via the one or more input interfaces 105 so as to lower a time constant associated with said at least one of the one or more input signals for matching a target time constant or so as to raise a high-pass cut-off frequency associated with said one of the one or more input signals to match a target high-pass cut-off frequency and to merge, following the high-pass filtering, the one or more inputs signals into an output signal having a pre-defined output format. The digital processing means 103 may comprise or correspond to digital processing circuitry.

The digital processing means 103 may be communicatively connected to the at least one memory 104. Alternatively, the digital processing means 103 may comprise the at least one memory 104 (not shown in FIG. 1).

Some example digital processing means for carrying out the processes according to embodiments may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry.

In some embodiments, the digital processing means 103 may comprise, for example, one or more field-programmable gate arrays (FPGAs) and/or one or more application-specific integrated circuits (ASICs). In some such embodiments, at least one of the one or more FPGAs and/or one or more ASICs may be configured specifically to implement the filtering functionalities according to embodiments.

In some embodiments, the digital processing means 103 may comprise at least one processor (e.g., a microprocessor and/or a digital signal processor). Furthermore, said at least one memory 104 may comprise one or more algorithms, such as a computer program code (software). The at least one memory 104 and computer program code may be configured, with the at least one processor 103, to cause the performing of the digital processing means 104 (or of the merging unit 101) according to embodiments. Said at least one memory 104 may also comprise at least one database.

The at least one memory 104 may be implemented using any suitable data storage technology, such as semiconductor-based memory devices, flash memory, magnetic memory devices and systems, optical memory devices and systems, fixed memory and removable memory.

Said at least one memory 104 may store a (current) value of a target time constant and/or a target high-pass cut-off frequency. Additionally, or alternatively, said at least one memory 104 may store filter settings of one or more digital filters used in embodiments.

In some embodiments, said at least one memory 104 may store a lookup table. Specifically, the lookup table may define a plurality of sets of filter settings of one or more digital filters (usable by the digital processing means 103 of the merging unit 101) for achieving plurality of target time constants and/or target highpass cut-off frequencies. To provide a more concrete non-limiting example, the lookup table may define, e.g., a set of filters for handling cutoff frequencies from 0.0 Hz to 1.0 Hz with 0.1 Hz or 0.05 Hz frequency step. In case of a nonlinear input with, e.g., 0.5 Hz cutoff frequency, the inverse filter of this is the same in each case only the frequencies between 0.5 Hz and 1.0 Hz need a lookup table with filter parameters.

In addition, or alternative to the lookup table, a filter design algorithm may be maintained in said at least one memory. The filter design algorithm may be configured to output a set of filter settings based on an input of a target time constant or a target high-pass cut-off frequency.

As mentioned above, the one or more output signals outputted via the one or more output interfaces 105 may be specifically fed to the one or more network devices 121, 122 (in the illustrated example, two network devices). The one or more network devices 121, 122 are, in general, (computing) devices supporting network operation. The plurality of network devices 121, 122 may be equally called SMV subscribers. Said one or more network devices 121, 122 may comprise one or more devices of any of the following types: a protective (or protection) device, a power quality device and a (power) measurement and/or metering device other than a power quality device.

The merging unit 101 may be, for example, a built-in merging unit of an instrument transformer as defined in, e.g., IEC 61869 or a stand-alone merging unit (SAMU) as defined in IEC 61869-13.

It should be noted that FIG. 1 presents a simplified view of a system 100 and specifically of a merging unit 101 therein. The system 100 and the merging unit 101 may comprise one or more further elements commonly found in substation protection and metering systems, substation automation systems or power systems and/or in merging units. For example, the merging unit may comprise synchronization means (e.g., an integrated clock or an interface enabling synchronization) for synchronization of the input signals received by it and power supplying means. The synchronization may employ, e.g., IEEE 1588 standard. In some embodiments, the merging unit 101 may comprise a built-in secondary converter or both a built-in primary converter and a built-in secondary converter.

Figure 2:
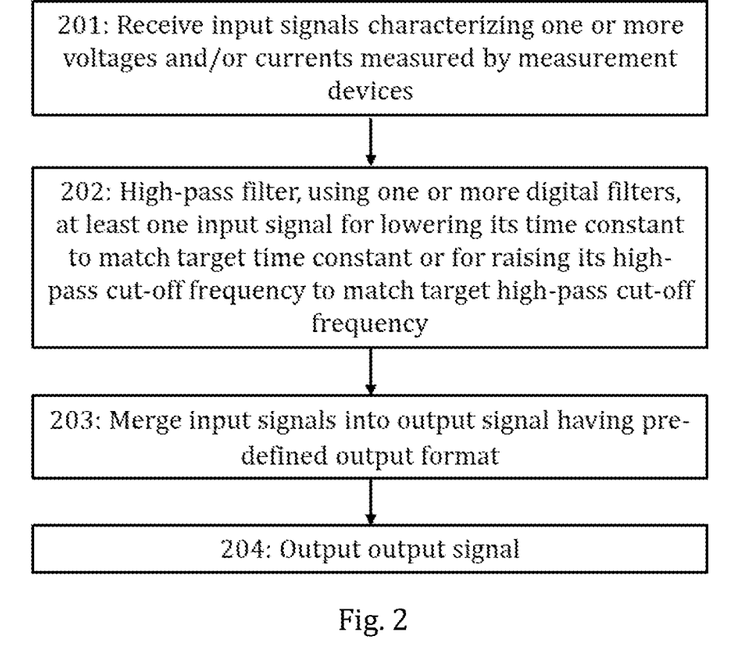
FIGS. 2 to 4 illustrate processes according to embodiments.

FIG. 2 illustrates a process according to embodiments for performing filtering and merging of measured input data. The process may be carried out by the merging unit 101 of FIG. 1 or a part thereof (namely, at least by the digital processing means 103). In the following, the entity carrying out the process is called a merging unit merely for simplicity of description.

Initially, the merging unit receives, in block 201, a plurality of input signals characterizing one or more voltages and/or one or more currents measured by a plurality of measurement devices of a substation automation system via one or more input interfaces of the merging unit. The one or more input interfaces may specifically comprise a plurality of input interfaces for connecting to the plurality of measurement devices as discussed in connection with FIG. 1. Additionally, or alternatively, the plurality of input signals may comprise one or more or a plurality signals characterizing a current (i.e., input current signals).

In some embodiments, each or at least one of the plurality of input signals received from the plurality of measurement devices may specifically be analog input signals. In such embodiments, the receiving in block 201 comprises also converting the received plurality of analog input signals to a plurality of digital input signals. The following steps of the process are then carried out for said plurality of digital input signals.

The merging unit high-pass filters, in block 202, using one or more digital filters, at least one of the plurality of input signals for either lowering a time constant associated with said at least one of the one or more input signals to match a target time constant or for raising a high-pass cut-off frequency associated with said one of the one or more input signals (being an effectively equal operation to lowering the time constant) to match a target high-pass cut-off frequency. In other words, the merging unit effectively worsens the frequency response of some of the input signals so as to form a modified set of input signals where all the input signals (or at least all current input signals) have the same frequency behavior and are thus compatible with each other. This may be beneficial, for example, in view of implementation of SMV based differential protection schemes. It should be noted that the merging unit hardware may place a limit on the minimum high-pass cutoff frequency but not on the maximum high-pass cut-off frequency which enables the aforementioned operation.

Said target time constant or target high-pass cut-off frequency may be pre-defined. In other words, a value of said target time constant or target high-pass cut-off frequency may be stored in a memory of the merging unit. Said target time constant or target high-pass cut-off frequency may be a (tunable) setting of the merging unit. If the merging unit is a built-in merging unit of an instrument transformer as defined, e.g., in IEC 61869, this (tunable) setting of the merging unit may specifically control the frequency responses of the primary and secondary converters of the merging unit. If the merging unit is a stand-alone merging unit as defined, e.g., in IEC 61869-13, this (tunable) setting of the merging unit may specifically control the frequency response of the current input of the stand-alone merging unit. See discussion in connection with FIG. 2 for detailed description of the tuning operation.

In some embodiments, said at least one of the plurality of input signals comprise or consist of one or more current signals (or specifically one or more analog current signals). In other words, the filtering in block 202 may be applied specifically to any current input signals received in block 201. Additionally, or alternatively, said at least one of the plurality of input signals may comprise or consist of one or more voltage signals (or one or more analog voltage signals).

In some embodiments, said at least one of the plurality of input signals may be specifically selected by the merging unit to be (current) signals whose time constant fails to exceed the target time constant or whose high-pass cut-off frequency falls below the target high-pass cut-off frequency.

The one or more digital filters may be such that they simulate the behavior of a current transformer. Such behavior corresponds to a 1st order analog high-pass RC filter in the analog domain while, in the digital domain, it may be achieved using an infinite impulse response (IIR) filter. The sampling frequency used in the digital filtering may, e.g., be equal to the output of the analog-to-digital converter (ADC) of the merging unit and/or measurement device(s). In practice, the IIR filter may be either a high-pass filter with the target time constant or highpass cut-off frequency (if the input hardware frequency response exhibits no highpass behavior) or a combination of an inverse filter (inverse of the input hardware frequency response) and a high-pass filter with the target time constant or highpass cut-off frequency, as will be described below in more detail.

The filter settings of the one or more digital filters may be determined based on the at least one of the one or more input signals and a lookup table or a filter design algorithm maintained in a memory of the merging unit. As described in connection with FIG. 1, the lookup table may define a plurality of sets of filter settings of the one or more digital filters for achieving plurality of target time constants and/or target high-pass cut-off frequencies and/or the filter design algorithm may be configured to output a set of filter settings based on an input of the target time constant or the target high-pass cut-off frequency.

Said target time constant and/or target high-pass cut-off frequency may have been defined (before the high-pass filtering) by a user input. Said user input may have been received either via a user input interface providing a connection to at least one user input device of the merging unit or via a communication interface providing a connection over one or more (wired and/or wireless) communication links and/or networks.

The merging unit merges, in block 203, the plurality of input signals into an output signal having a pre-defined output format. It should be emphasized that the merging in block 203 is performed following the high-pass filtering, i.e., for a plurality of (digital) input signals comprising at least one high-pass filtered signal. The pre-defined format of the output signal may be a standard-based format such as a format defined in IEC 61850-9-2 for an output of a merging unit.

Finally, the merging unit outputs, in block 204, the output signal via one or more output interfaces. The output signal may be outputted specifically to a network device (e.g., a protective device). In other embodiments, a plurality of (identical) output signals may be outputted to a plurality of network devices.

As described above, the merging unit may maintain in a memory of the merging unit information on value(s) of a target and/or a target high-pass cut-off frequency. It would be beneficial if said value(s) could be changed by the user, i.e., that it would be defined as user-defined setting of the merging unit. FIG. 2 illustrates a process according to embodiments for implementing such functionality. The process may be carried out by the merging unit 101 of FIG. 1 or a part thereof (namely, at least by the digital processing means 103). In the following, the entity carrying out the process is called a merging unit merely for simplicity of description.

Figure 3:
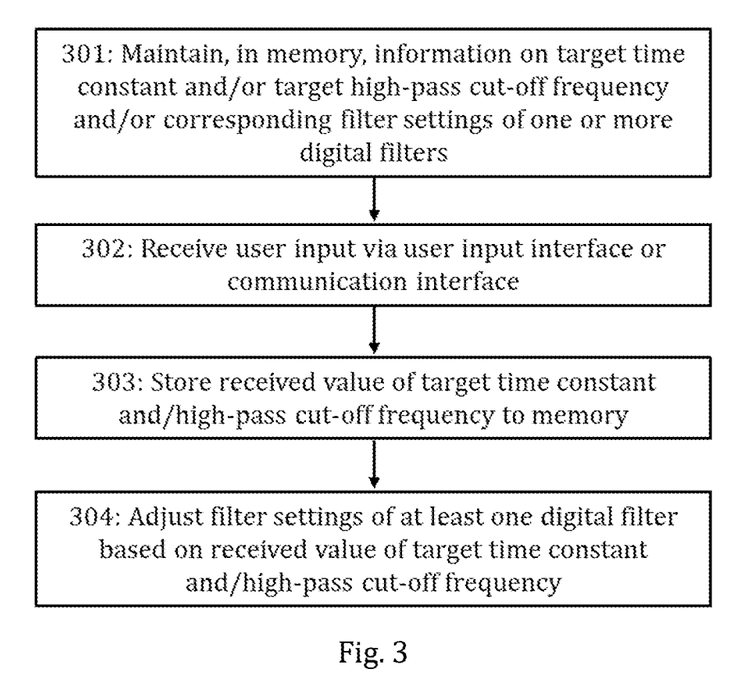

Initially, the merging unit is assumed, in block 301, to maintain, in at least one memory, information on the target time constant and/or the target highpass cut-off frequency. Additionally, or alternatively, the merging unit may maintain in said at least one memory information on filter settings of the one or more digital filters (or some of them) for implementing the target time constant and/or the target high-pass cut-off frequency. As mentioned above, the one or more digital filters may comprise specifically IIR filters. The filter settings for a given IIR digital filter may comprise, e.g., feedforward filter coefficients, feedback filter coefficients, feedforward filter order and/or feedbackward filter order.

The merging unit receives, in block 302, a user input (or a signal comprising information on a user input) via a user input interface or a communication interface of the merging unit. As discussed in connection with FIG. 1, the merging unit may comprise at least one user input interface for receiving inputs provided by user via at least one user input device of the merging unit (or connected thereto) and/or at least one communication interface for receiving signals over at least one communication link and/or network.

In some embodiments, the merging unit may check whether the value of the target time constant and/or the target high-pass cut-off frequency received in block 302 is different from a corresponding value maintained in said at least one memory and proceed further in the process only if the received value is a new value not maintained in said at least one memory.

In response to the receiving in block 302, the merging unit stores, in block 303, a received value of the target time constant or target high-pass cut-off frequency to said at least one memory. In other words, the merging unit updates the current value of the target time constant or target high-pass cut-off frequency maintained in said at least one memory to match the received (user-defined) value.

Additionally, the merging unit adjusts, in block 304, filter settings of the one or more digital filters (or some of them) based on the target time constant or the target high-pass cut-off frequency defined by the user input. The adjusting in block 304 may be carried out in response to the receiving in block 302 or subsequently, e.g., in response to receiving input signals for merging which require filtering (as discussed in connection with FIG. 1). Specifically, the filter properties of high-pass digital (IIR) filter(s) defined according to the target time constant and/or the target high-pass cut-off frequency may be adjusted in block 304 (see discussion below in connection with FIG. 4). The adjusting may be carried out, as described also above, based on a lookup table or a filter design algorithm maintained in said at least one memory.

Figure 4:
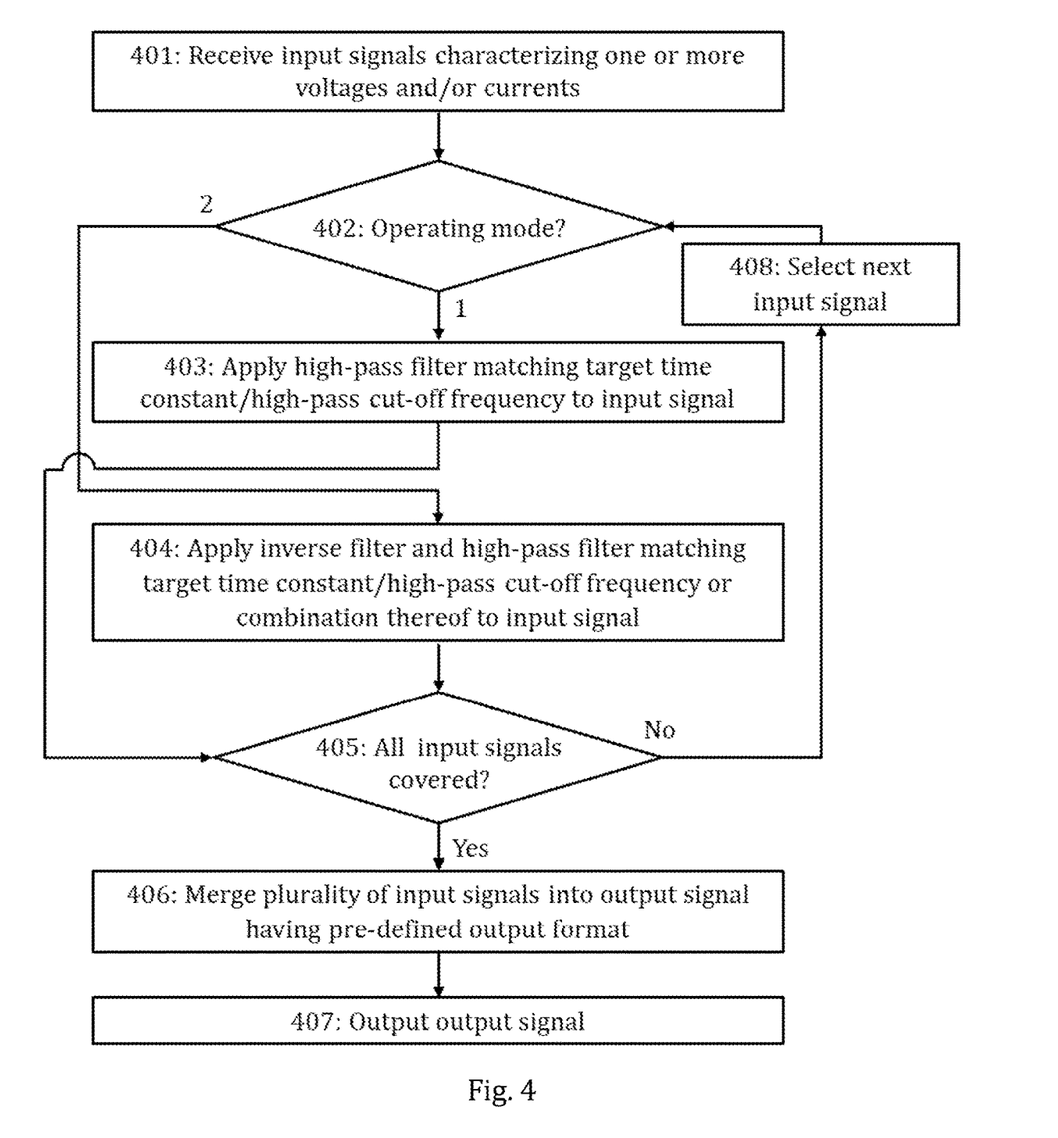

FIG. 4 illustrates another, more detailed process according to embodiments for performing filtering and merging of measured input data. The process may be carried out by the merging unit 101 of FIG. 1 or a part thereof (namely, at least by the digital processing means 103). Any of the features discussed in connection with FIG. 2 may be applied to the process of FIG. 4. In the following, the entity carrying out the process is called a merging unit merely for simplicity of description. The process of FIG. 4 may be preceded by the process of FIG. 3.

Referring to FIG. 4, block 401 may correspond fully to block 201 of FIG. 2. Following the reception in block 401, the operation of the merging unit depends on the current operating mode (or a current operating setting) of the merging unit. Two different operating modes may be defined for filtering different types of input signals, e.g., as follows: a first operating mode may be for filtering input signals exhibiting no high-pass behavior and a second operating mode may be for filtering input signals exhibiting high-pass behavior failing to meet the target time constant or the target high-pass cut-off frequency. Information on the current operating mode may be maintained in at least one memory of the merging unit. The operating mode may be a setting of the merging unit which is settable by a user (e.g., via a user input interface or remotely via a communication interface). The setting of the operating mode may be carried out in a similar or analogous manner as discussed in connection with FIG. 3 for setting the target time constant and/or the target high-pass cut-off frequency for the plurality of input signals (though, obviously, block 304 of FIG. 3 is not applicable in this case). It should be noted that high-pass behavior of the input signal may depend not only on the input signal itself but also on the high-pass properties of a given (analog) input interface of the merging unit.

If the merging unit is currently configured to operate using the first operating mode for filtering input signals exhibiting no high-pass behavior (i.e., corresponding to a shunt input) in block 402, the merging unit applies, in block 403, a high-pass digital (IIR) filter matching the target time constant and/or the target high-pass cut-off frequency to the input signal. The filter settings of the high-pass digital (IIR) filter may have been determined previously and may be maintained in the at least one memory of the merging unit. Thus, the input signal in question is modified to correspond to the target time constant and/or the target high-pass cutoff frequency. The target time constant and/or the target high-pass cut-off frequency may be defined as discussed in connection with FIG. 1 (e.g., it may be defined via a user input).

If the merging unit is currently configured to operate using the second operating mode for filtering input signals exhibiting high-pass behavior failing to meet the target time constant or the target high-pass cut-off frequency in block 402, the merging unit applies, in block 404, an inverse digital (IIR) filter and a high-pass digital filter matching the target time constant and/or the target high-pass cut-off frequency consecutively (i.e., one after another) to the input signal. The inverse digital filter signal may be defined to correspond to an inverse filter for (assumed) high-pass behavior of the input signal (i.e., an inverse filter for a frequency response of the input signal).

Alternatively, the merging unit may apply, in block 404, a digital (IIR) filter corresponding to a combination of the inverse and high-pass digital filters (e.g., derived as a product of the frequency response of the inverse and high-pass digital filters) to the input signal. Obviously, the input signal has, following block 404, the same form in both cases. In either case, the input signal in question is modified to increase the high-pass cut-off frequency (or equally to lower the time constant).

While not shown in FIG. 4 for simplicity of presentation, the merging unit may, obviously, also have a third operating mode where no filtering is carried out for the input signal.

Once the input signal has been filtered in block 403 or block 404, the merging unit checks, in block 405, whether all of the plurality of input signals have been covered (i.e., whether the process of blocks 402 to 404 has been carried out for all input signals). If this is not the case, the merging unit selects, in block 408, the next input signal of the plurality of input signal for analysis and potential filtering and repeats actions pertaining to blocks 402, 403, 405 or 402, 404, 405. If all of the plurality of input signals have been covered in block 405, the merging unit proceeds to blocks 406, 407. Said blocks 406, 407 may correspond fully to blocks 203, 204 of FIG. 2.

In some embodiments, actions relating to blocks 402 to 408 may be carried out only for one or more current input signals of the plurality of input signals received in block 401.

In some alternative embodiments, only one of the first and second operating modes may be defined.

The blocks, related functions, and information exchanges described above by means of FIGS. 2 to 4 are in no absolute chronological order, and some of them may be performed simultaneously or in an order differing from the given one. Other functions can also be executed between them or within them, and other information may be sent, and/or other rules applied. Some of the blocks or part of the blocks or one or more pieces of information can also be left out or replaced by a corresponding block or part of the block or one or more pieces of information.

Embodiments as described may also be carried out in the form of a computer process defined by a computer program or portions thereof. Embodiments of the methods described in connection with FIGS. 2 to 4 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the embodiments have been described above with reference to examples according to the accompanying drawings, it is clear that the embodiments are not restricted thereto but can be modified in several ways within the scope of the appended claims. Therefore, all words and expressions should be interpreted broadly, and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A merging unit comprising:
one or more input interfaces for receiving a plurality of input signals which characterize one or more voltages and/or one or more currents measured by a plurality of measurement devices;
at least one processor and at least one memory including computer program code, the at least one memory and the computer program code being configured, with the at least one processor, to cause:
high-pass filtering, using one or more digital filters, at least one of the plurality of input signals for lowering a time constant associated with the at least one of the one or more input signals to match a target time constant or for raising a high-pass cut-off frequency associated with the at least one of the one or more input signals to match a target high-pass cut-off frequency, and
merging, following the high-pass filtering, the plurality of input signals into an output signal having a pre-defined output format; and
one or more output interfaces for outputting the output signal;
wherein the at least one memory and the computer program code are further configured, with the at least one processor, to cause the high-pass filtering, for each of the plurality of input signals, by:
if the merging unit is currently configured to operate using a first operating mode for filtering input signals exhibiting no high-pass behavior, applying a high-pass digital filter matching the target time constant and/or the target high-pass cut-off frequency to the input signal; and
if the merging unit is currently configured to operate using a second operating mode for filtering input signals exhibiting high-pass behavior failing to meet the target time constant or the target high-pass cut-off frequency, applying an inverse digital filter and a high-pass digital filter matching the target time constant and/or the target high-pass cut-off frequency consecutively or a digital filter corresponding to a combination of the inverse and high-pass digital filters to the input signal.

2. The merging unit according to claim 1, wherein the at least one of the plurality of input signals includes or consists of one or more current signals.

3. The merging unit according to claim 1, wherein the at least one memory and the computer program code are configured, with the at least one processor, to further cause selecting the at least one of the plurality of input signals to be signals associated with a time constant which fails to exceed the target time constant or a high-pass cut-off frequency which falls below the target high-pass cut-off frequency.

4. The merging unit according to claim 1, wherein the at least one memory and the computer program code are configured, with the at least one processor, to further cause:
maintaining, in the at least one memory, information on the target time constant and/or the target high-pass cut-off frequency and/or information on filter settings of the one or more digital filters for implementing the target time constant and/or the target high-pass cut-off frequency.

5. The merging unit according to claim 1, further comprising:
at least one user input interface for receiving, via at least one user input device, a user input defining the target time constant and/or the target high-pass cut-off frequency for the plurality of input signals; and/or
at least one communication interface for receiving, over a communication link or network, a signal defining a user input defining the target time constant and/or the target high-pass cut-off frequency for the plurality of input signals, wherein the at least one memory and the computer program code are configured, with the at least one processor, to further cause
in response to receiving a user input defining the target time constant or target high-pass cut-off frequency via the at least one user input interface or the at least one communication interface, store a received value of the target time constant or target high-pass cut-off frequency to the at least one memory; and
adjust filter settings of at least one of the one or more digital filters based on the target time constant or the target high-pass cut-off frequency defined by the user input.

6. The merging unit of claim 5, wherein the at least one memory and the computer program code are configured, with the at least one processor, to further cause:
maintaining, in the at least one memory, a lookup table defining a plurality of sets of filter settings of the one or more digital filters for achieving plurality of target time constants and/or target high-pass cut-off frequencies; and
performing the adjusting of the filter settings of the at least one of the one or more digital filters based on the lookup table.

7. The merging unit according to claim 1, wherein the one or more input interfaces or a part thereof include an analog-to-digital input interfaces for converting a received analog input signal to a digital input signal.

8. The merging unit according to claim 1, wherein the plurality of input signals are analog input signals, the merging unit further comprising:
an analog-to-digital converter for converting the plurality of input signals to digital signals for processing by the at least one processor with the at least one memory including the computer program code.

9. The merging unit according to claim 1, wherein the one or more digital filters are infinite impulse response filters.

10. The merging unit according to claim 1, wherein the pre-defined format of the output signal is a standard-based format based on IEC 61850-9-2.

11. The merging unit according to claim 1, further comprising:

one or more field-programmable gate arrays, FPGAs, and/or one or more application-specific integrated circuits, ASICs for performing at least the high-pass filtering.

12. A method comprising the following steps:

receiving a plurality of input signals which characterize one or more voltages and/or one or more currents measured by a plurality of measurement devices;

high-pass filtering, using one or more digital filters, at least one of the plurality of input signals for lowering a time constant associated with the at least one of the one or more input signals to match a target time constant or for raising a high-pass cut-off frequency associated with the at least one of the one or more input signals to match a target high-pass cut-off frequency;

merging, following the high-pass filtering, the plurality of input signals into an output signal having a pre-defined output format; and outputting the output signal;

wherein the high-pass filtering, for each of the plurality of input signals, is performed by:

if operating using a first operating mode for filtering input signals exhibiting no high-pass behavior, applying a high-pass digital filter matching the target time constant and/or the target high-pass cut-off frequency to the input signal; and if operating using a second operating mode for filtering input signals exhibiting high-pass behavior failing to meet the target time constant or the target high-pass cut-off frequency, applying an inverse digital filter and a high-pass digital filter matching the target time constant and/or the target high-pass cut-off frequency consecutively or a digital filter corresponding to a combination of the inverse and high-pass digital filters to the input signal.

13. A non-transitory computer readable medium comprising program instructions that, when executed by an apparatus, cause the apparatus to perform at least the following steps:

receiving a plurality of input signals which characterize one or more voltages and/or one or more currents measured by a plurality of measurement devices;

high-pass filtering, using one or more digital filters, at least one of the plurality of input signals for lowering a time constant associated with the at least one of the one or more input signals to match a target time constant or for raising a high-pass cut-off frequency associated with the at least one of the one or more input signals to match a target high-pass cut-off frequency;

merging, following the high-pass filtering, the plurality of input signals into an output signal having a pre-defined output format; and outputting the output signal;

wherein the program instructions, when executed by the apparatus, further cause the apparatus to perform the high-pass filtering, for each of the plurality of input signals, by:

if the apparatus is currently configured to operate using a first operating mode for filtering input signals exhibiting no high-pass behavior, applying a high-pass digital filter matching the target time constant and/or the target high-pass cut-off frequency to the input signal; and in the apparatus is currently configured to operate using a second operating mode for filtering input signals exhibiting high-pass behavior failing to meet the target time constant or the target high-pass cut-off frequency, applying an inverse digital filter and a high-pass digital filter matching the target time constant and/or the target high-pass cut-off frequency consecutively or a digital filter corresponding to a combination of the inverse and high-pass digital filters to the input signal.

* * * * *